A. G. THOMSON.
TIRE ARMOR.
APPLICATION FILED AUG. 5, 1908.
950,417.
Patented Feb. 22, 1910.
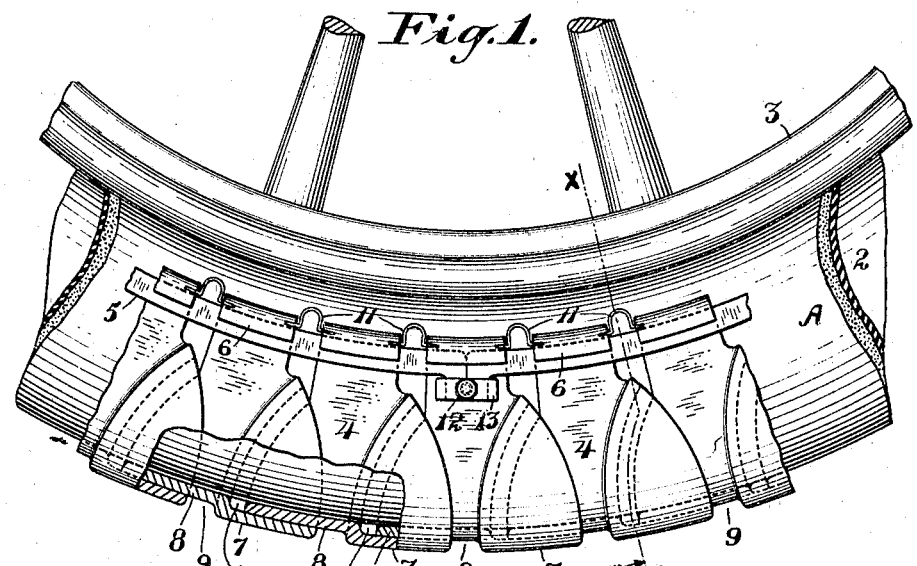
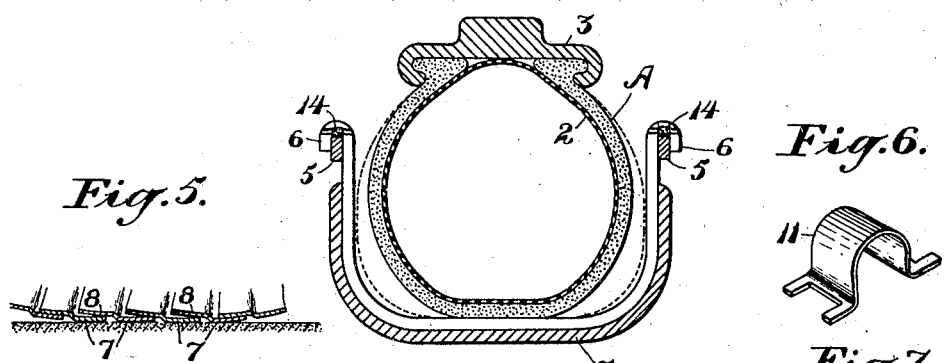
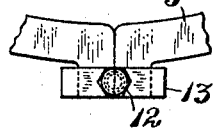
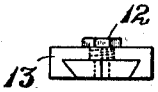
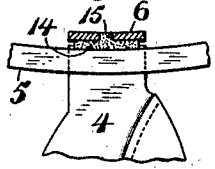
WITNESSES:
F. C. Fliedner
INVENTOR
Arthur Gale Thomson
BY
Geo. H. Strong
his ATTORNEY

UNITED STATES PATENT OFFICE.

ARTHUR GALE THOMSON, OF SAN FRANCISCO, CALIFORNIA, ASSIGNOR OF ONE-HALF TO ALBERT SUTTON, OF SAN FRANCISCO, CALIFORNIA.

TIRE-ARMOR.

950,417.  Specification of Letters Patent.  Patented Feb. 22, 1910.

Application filed August 5, 1908. Serial No. 447,031.

*To all whom it may concern:*

Be it known that I, ARTHUR GALE THOMSON, citizen of England, residing in the city and county of San Francisco and State of California, have invented new and useful Improvements in Tire-Armor, of which the following is a specification.

This invention relates to a protective and armor attachment for pneumatic tires, and pertains especially to a means for protecting from abrasive wear and punctures the ordinary pneumatic tires employed on automobiles and other vehicles designed to be driven at high speed over common roads.

Experience and practice have shown that a pneumatic tire, in order to have its resilient qualities utilized to the fullest extent, and permit the greatest benefit to be derived from the use of such tires, must be able to expand and flatten, more or less, as it comes in contact with the ground. For instance, each pneumatic tire of an average automobile wheel is obliged to sustain a weight of half a ton, more or less. An inflated tire of a heavy machine will have an area of contact with the ground which is approximately eight inches, more or less, in length, and three to four inches in width. This flattening out of the tire necessarily results in a constant change in the cross-section of the tire due to the pushing in of the tread toward the wheel rim and its subsequent expansion, and the consequent alternate lateral distention and contraction of the tire. Experience has also shown that any form of rigid armor placed upon the tire which does not provide for this constant change in the cross-section of the tire destroys the real cushion benefits which the use of the pneumatic tire is primarily designed to secure.

The object of the present invention is to provide a simple, practical, metallic covering for pneumatic tires composed of a series of overlapping inelastic plates of peculiar form which will permit of the lateral distention of the tire, thereby utilizing to a maximum degree the elastic and resilient properties of the pneumatic tire; also to so design and connect these metallic plates as to avoid flexure, and to permit independent relative movement of the tire and the armor, whereby the armor adapts itself to the tire; also to mount the armor so that it will not require attachment to the wheel rim, but will be capable of independent circumferential movement; and also to provide an armor whereby additional adhesion and traction will be obtained.

The invention consists of the parts and the construction and combination of parts as hereinafter more fully described and claimed, having reference to the accompanying drawings, in which—

Figure 1 is a side elevation in partial section of a segment of a wheel, showing the application of the invention. Fig. 2 is a cross-section on the irregular line X—X of Fig. 1. Fig. 3 is a detail of the means for connecting the ends of a ring. Fig. 4 is a plan view of the clamp of Fig. 3. Fig. 5 is a diagrammatic view representing the position of the armor plates when in contact with the ground and under the load of the vehicle. Fig. 6 is a perspective of the spring separator. Fig. 7 is a detail in partial section of the fiber bushing.

A represents an inflatable tire or outer casing of ordinary construction, here shown as provided with the inner tube 2 and secured to a rim 3 in any suitable manner well known in the art.

My invention comprehends the use of a series of overlapping, preferably inelastic metal plates or scales 4. These scales extend circumferentially around the tire and are held in place by suitable means, as the rings 5 engaging the loops 6 formed by bending outwardly the edges of the scale sections on each side of the tire. Each scale is substantially U-shape in cross-section and is essentially wider than the tire when the same is inflated and not in contact with the ground, as shown in Fig. 2. Each plate has substantially triangular side members, as shown in Fig. 1, with the contracted portion of the side drawn in and the end bent outwardly to form the loop 6; each loop and each plate, except where the latter bears directly on the overlapping plate, being out of contact with each other, so as to prevent noise as the wheel travels over the ground.

Each plate or scale is made on two different radii; the portion 7 of greater radius being the actual tread portion of the tire, while the portion 8 of lesser radius fits inside of the portion 7 of the next succeeding scale. The several exterior portions 7 normally have their outer surfaces which run on the ground lying in the plane of a true circle; and similarly, the inner surfaces of the inner portions 8 against which the tire bears lie in the plane of a circle concentric with the first. The plates when assembled on the wheel are arranged with outer open spaces 9 between them, and with intervening inner spaces 10, whereby a limited circumferential movement of each plate, independent of the others, is permitted; the walls of the spaces 10 being rounded so as not to pinch or abrade the tire in any way. It is found in practice that by placing these scales or plates on a wheel and spacing them apart, engaging them by the freely movable ring 5 and then pumping up the tire, the plates will practically maintain their relative position with the loop portions 6 a uniform distance apart, and the spaces 9 and 10 normally open. These open spaces 9 and 10 permit of the necessary telescoping sliding action of one plate on the other as they come in contact with the ground, the plates crowding slightly together as they strike the ground, and then opening out to their normal original position as they leave the ground and once more assume the curvature of the wheel. The spaces or grooves 9 have the additional function of providing a corrugated exterior to assist in traction and avoid skidding. In actual practice there are about four of these plates always in contact with the ground, and when they are in contact their outer tread surfaces 7 lie in a flat plane substantially parallel with the ground, as represented in Fig. 5.

If desired, suitable means, as U-shaped or equivalent springs 11, may be interposed between the plates for the purpose of preventing their creeping toward each other; but actual practice shows that these springs are not usually necessary. The springs as here shown are U-shaped and fit in transverse notches in the lugs 6 and inside of the ring 5 so as not to interfere with the independent rotative movement of the latter.

The extra width of the scales with respect to the tire, as shown in Fig. 2, permits any portion of the tire to be distended and assume practically the dotted line position represented in Fig. 2 whenever the scales covering that portion of the tire rest on the ground. Thus each time a plate comes in contact with the ground its interior is substantially filled by the tire, and in this distention of the tire the plates are centered so that the tire practically always fits centrally of the plates or sections, as represented in Fig. 2.

I have found in practice, that if I attempt to use a rigid metal scale or protective plate which will just fit the tire when the latter is not resting on the ground, that I have destroyed, in fact, much of the resilient quality of the tire. I have also found that the ring 5 should be free to rotate independent both of the wheel and of the armor sections or scales, because in actual practice, this ring will rotate in a direction opposite to the direction of revolution of the wheel, and the pulling force exerted upon the ring is very great. It is therefore that I prefer to form each ring with outwardly bent ends, as shown in Fig. 3, which ends are embraced by a clamp, as 13 in Fig. 4, and secured in place by suitable means, as the clamp screw 12.

It will thus be seen that this armor is maintained on the wheel independent of any connections with the rim or spokes; that the slight circumferential movement of the armor sections one upon the other enables the armor to assume at the bottom a flattened bearing surface on the road-bed corresponding to the surface assumed by the tire itself; and that the double curves of the telescoping sections form a practically continuous, flat bearing surface for the tire, and at the same time a corrugated exterior is provided to add to the tractive force of the wheel; while the making of the sections wider than the tire allows for distention.

In order to render the operation of the sections as noiseless as possible, I may, under some circumstances, interpose fiber bushings, as 14, in the bottom of the grooves to form a seat for the ring 5; these bushings having projections 15 or equivalent means fitting perforations in the loops to keep the bushings in place.

Each section as it comes in contact with the ground will pivot on the rings 5, and each section will also pivot over the front edge of its companion sections, as shown in Fig. 5, thereby tending always to exclude the dirt and dust from between the tread of the sections.

It is possible that various changes may be made in the details of the invention without departing from the principle thereof, and I do not wish to be understood as limiting myself to the precise structure here shown and described.

Having thus described my invention, what I claim and desire to secure by Letters Patent is—

1. The combination with a vehicle tire, of a series of uniform articulated plates curved in cross-section, rigid, and having a width greater than the normal width of the tire to permit lateral distention of the latter, and means for holding the plates in circumferential position on the tire, said last-named means comprising rings engaging loops on the lateral edges of the plates, said rings having a free rotative movement in said loops independent of the plates the inner ends of the plates being spaced from each other, and resilient members interposed between the separated inner ends of the plates adapted to prevent the plates creeping toward each other.

2. The combination with a vehicle tire, of an articulated armor therefor comprising a series of rigid metallic sections substantially U-shape in cross-section, said sections formed with two different radii, the portion of a section of lesser radius fitting within a portion of greater radius of a succeeding section, said sections having their inner ends spaced from each other, resilient connections spanning the space between the separated ends of adjacent sections and forming a connection therebetween, said sections having a limited sliding movement one on the other circumferentially of the wheel, said sections having reduced lateral edges, and rings disconnected with the wheel engaging said reduced edges, said rings free to rotate independently of the armor and wheel.

3. The combination with a vehicle tire, of an articulated armor therefor comprising a series of rigid metallic sections substantially U-shape in cross-section, said sections formed with two different radii, the portion of a section of lesser radius fitting within a portion of greater radius of a succeeding section, said sections having their inner ends spaced from each other, and inverted U-shaped springs spanning the space between the separated ends of adjacent sections and forming a connection therebetween, said sections having a limited sliding movement one on the other circumferentially of the wheel, said sections having reduced lateral edges, and rings disconnected with the wheel engaging said reduced edges, said rings free to rotate independently of the armor and wheel, and said sections being formed rigid and of greater width than the normal width of the tire to permit of the distention of the latter.

4. A protective armor for vehicle tires comprising a series of metallic sections substantially U-shaped in cross section, said sections having outwardly bent open loops on their lateral edges, rings over which said loops freely pass to form sliding guides for the sections, resilient connections between the adjacent inner ends of the sections, and fiber bushings seating within said loops and engaging said rings.

In testimony whereof I have hereunto set my hand in presence of two subscribing witnesses.

ARTHUR GALE THOMSON.

Witnesses:
  CHARLES A. PENFIELD,
  HENRY P. TRICOU.